United States Patent [19]

Mellon

[11] Patent Number: 4,759,054
[45] Date of Patent: Jul. 19, 1988

[54] TOLL TELEPHONE SYSTEM AND METHOD FOR MAINTAINING OR INITIATING LOOP CURRENT AFTER RESUMING ON-HOOK CONDITION

[75] Inventor: Regis B. Mellon, Mulberry, Fla.

[73] Assignee: Protel, Inc., Lakeland, Fla.

[21] Appl. No.: 944,569

[22] Filed: Dec. 22, 1986

[51] Int. Cl.⁴ ...................... H04M 17/00; H04M 1/06
[52] U.S. Cl. .................................... 379/145; 379/123
[58] Field of Search ............................... 379/143–145, 379/155, 387, 413, 123

[56] References Cited

U.S. PATENT DOCUMENTS 4,595,983 6/1986 Gehalo et al. .................. 379/144 X
4,625,078 11/1986 Grouch et al. ...................... 379/145

FOREIGN PATENT DOCUMENTS 0169507 1/1986 European Pat. Off. ........... 379/155

Primary Examiner—Stafford D. Schreyer
Attorney, Agent, or Firm—Duckworth, Allen, Dyer & Doppelt

[57] ABSTRACT

A toll telephone connected to a coin trunk including tip and ring conductors in which loop current flows from the central office and through the telephone responsive to an off-hook condition at the telephone includes electronic circuitry for maintaining the loop current flow through the telephone for a predetermined period of time after the hook switch is opened, in order to accomplish certain telephone functions. Those functions include operation of an escrow relay, prevention of hook switch fraud, prevention of central office call termination until the call is legitimately completed and completion of certain call accounting functions.

5 Claims, 3 Drawing Sheets

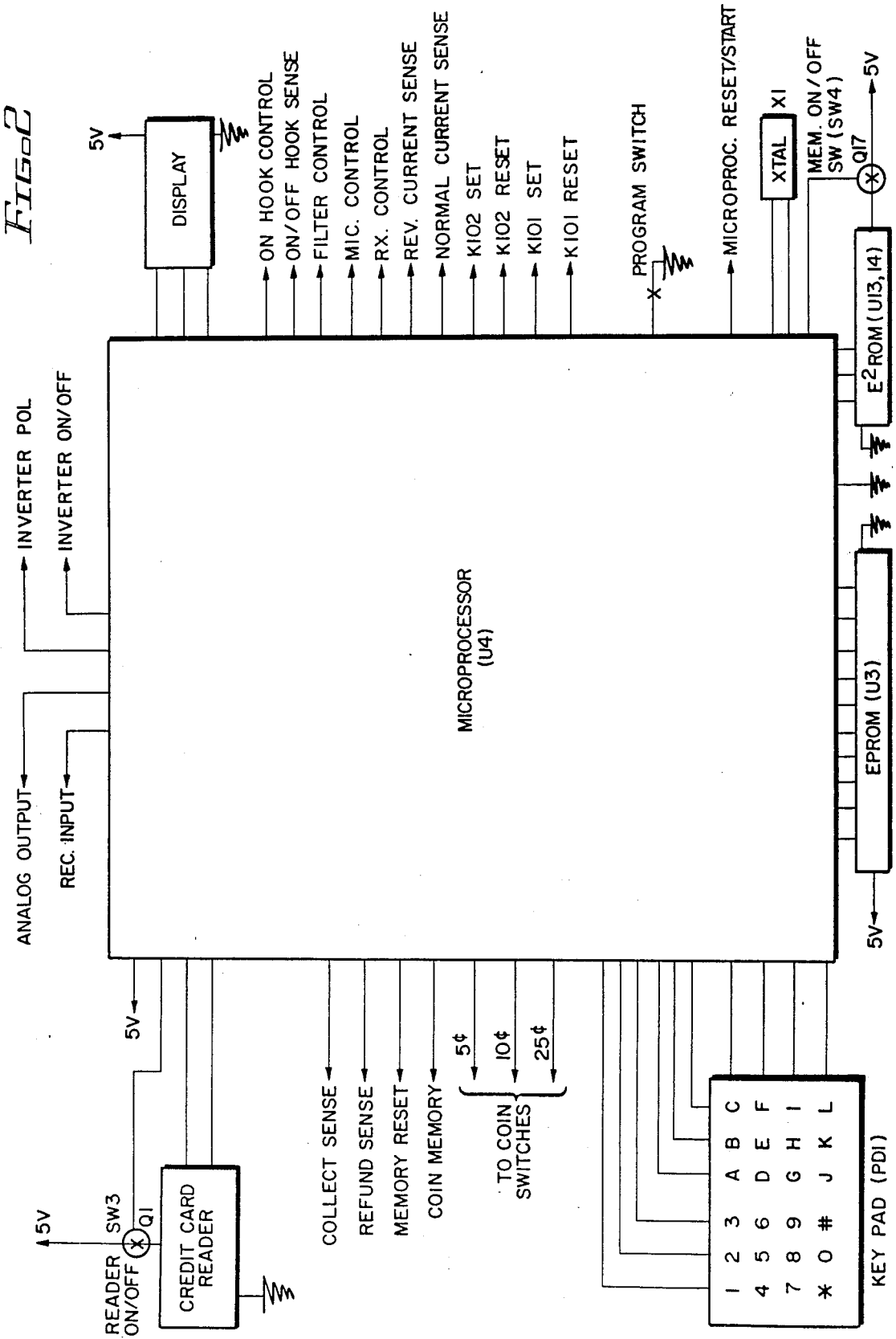

4,759,054

TOLL TELEPHONE SYSTEM AND METHOD FOR MAINTAINING OR INITIATING LOOP CURRENT AFTER RESUMING ON-HOOK CONDITION

BACKGROUND OF THE INVENTION

1. Field of the Invention

The present invention relates to the telephone art, and particularly to toll telephone systems and methods.

2. Description of the Prior Art

Prior art telephone systems utilize a telephone instrument which receives battery and loop current inputs from a central office. A conventional coin telephone is typically provided with an escrow relay that holds the coins in escrow until completion of the telephone call. After the telephone resumes the on-hook condition, the central office battery voltage is manipulated to operate the escrow relay and collect the escrowed coins into the coin box of the telephone.

SUMMARY OF THE INVENTION

The present invention has as its purpose the provision for a toll telephone system and method in which the telephone is not powered from any external source, and is particularly adapted for a telephone system and method, described in greater detail below, in which the telephone electronic circuitry is powered entirely from the direct current component of the loop current. In those circumstances, there is a need for maintaining loop current for a predetermined period of time after the telephone resumes the on-hook condition, in order to accomplish certain desired functions.

To this end, the telephone is provided with a hook switch for closing a circuit path between the tip and ring conductors forming a coin trunk which is coupled to a central office, and through which loop current flows responsive an off-hook condition being sensed at the central office.

In accordance with the present invention, the telephone is provided with means for maintaining loop current flow through the telephone for a predetermined period of time after the hook switch is opened. This means for maintaining the loop current flow is for a period of time sufficient to operate the escrow control relays, for prevention of any attempt at hook switch fraud, for preventing central office hang-up until the call is legitimately terminated, and further for a period of time sufficient to permit the telephone to complete all call accounting functions.

DESCRIPTION OF THE DRAWINGS

FIG. 2 illustrates pin connections of a microprocessor circuit and associated electronics used with the telephone system of FIG. 1.

DETAILED DESCRIPTION OF THE PREFERRED EMBODIMENT

Figure 1A:
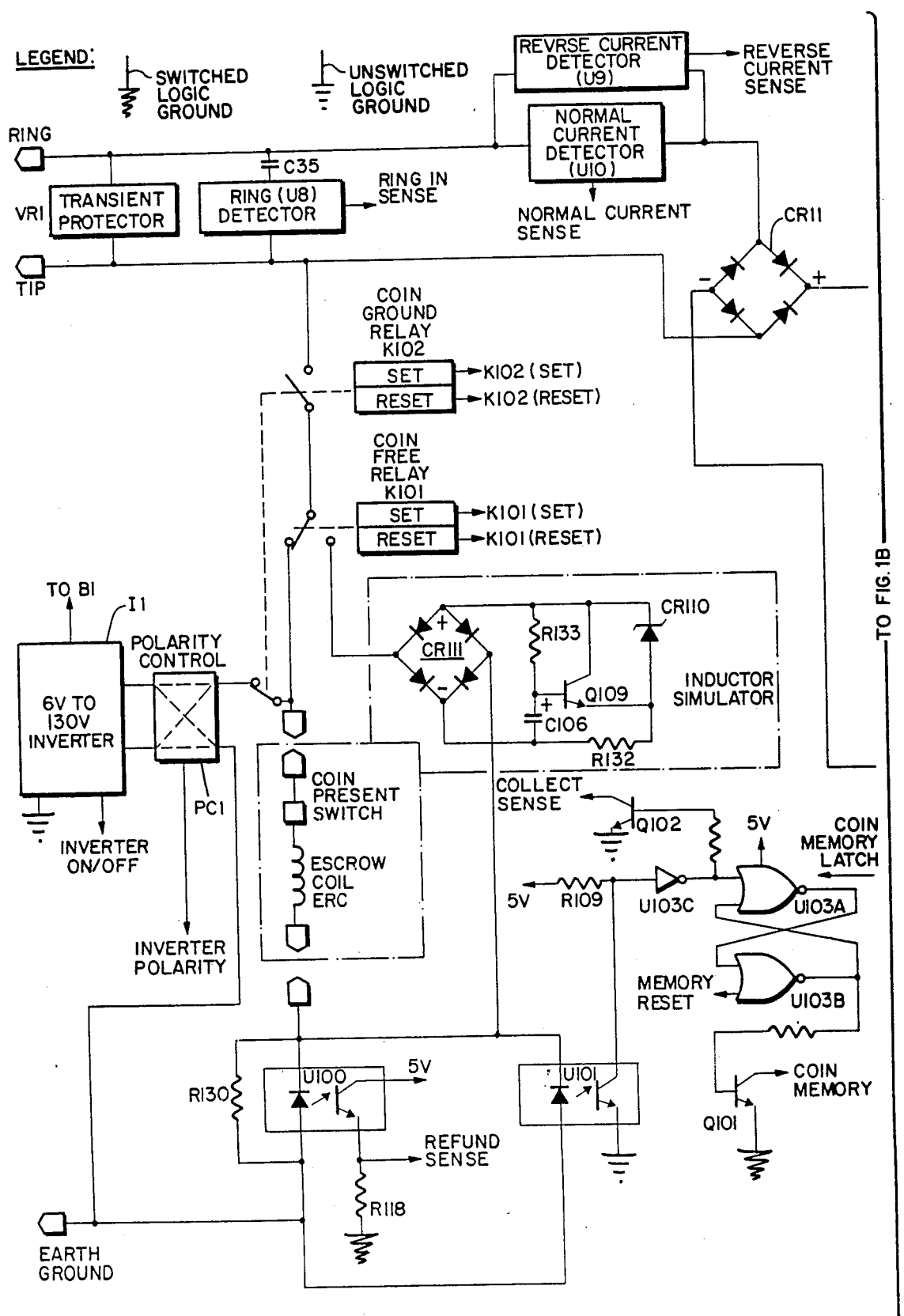
FIGS. 1A and 1B together are schematic illustrations, partially in block diagram form, of the electronic circuitry for a telephone system in accordance with the present invention.

A preferred embodiment of the present invention will now be described with reference to FIGS. 1A, B and 2, in which various reference numerals include letter prefixes to designate certain characteristics of the electronic circuitry. For example, the prefix "R" refers to a resistor; the prefix "C" refers to a capacitor; the prefix "Q" refers to a transistor; the prefix "K" refers to a relay; the prefix "CR" refers to a diode; the prefix "U" refers to an integrated circuit device and the prefix "I" refers to an inverter. These reference letters are conventionally used in the electronic arts.

Other conventional designations are used in accordance with the telephony art. For example, the terms "tip conductor" and "ring conductor" refer to those circuit conductors which are coupled to a central office for providing a conventional loop current through the telephone unit to facilitate various telephone functions. The term "ground" is intended to refer to some common electric reference point.

It will be understood by those skilled in the art that the telephone shown in the drawing is associated with a central office having tip and ring conductors which are respectively attached to the "tip" lead and "ring" leads of the schematic shown in FIG. 1A. Additionally, a "ground" GND connection is provided. It is important to note that there are two different logic grounds shown in the drawing, including a non-switched logic ground which is always applied for either on or off-hook conditions, and a switched ground reference which is applied only when the telephone is in the off-hook condition; a legend for these two logic grounds is shown in the upper left hand corner of FIG. 1A. The switched ground is at a 5-volt potential in the on-hook condition. For purposes of discussion, all of the relays are shown in the deenergized state. As will be hereinafter described, the telephone shown in the drawing requires no connection to an external power source; rather, all power required to energize all of the electrical and electronic circuitry of the telephone is derived from the loop current flowing through the tip and ring conductors from the central office and through the telephone during an off-hook condition. While a 6-volt battery B1 is shown in the drawing, this battery only provides a backup and remains in a charging state during the off-hook condition. During on-hook conditions, the telephone shuts down all power consuming circuits and completely disconnects the battery B1 from the circuit when the phone is on-hook.

Figure 1B:
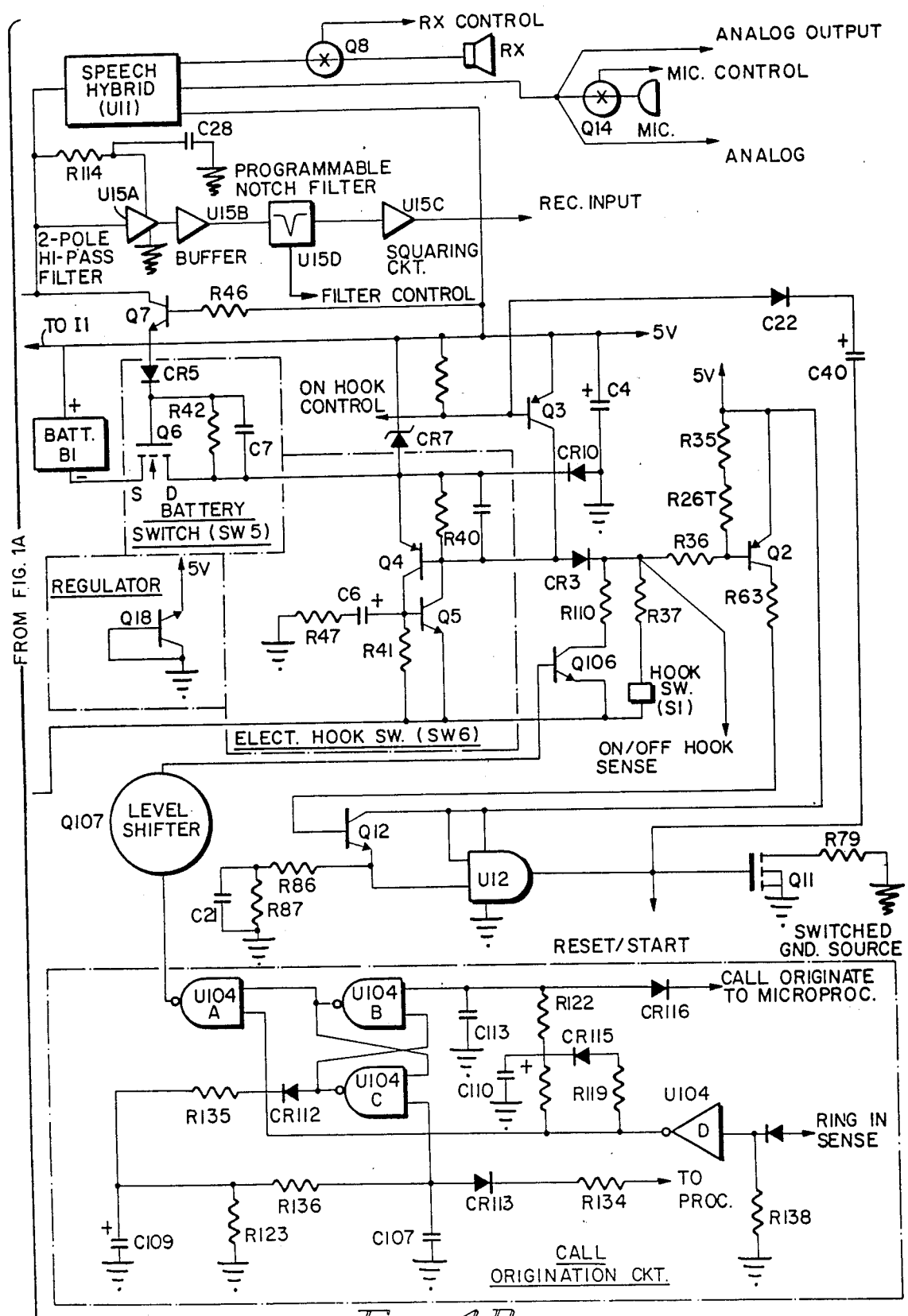

The particular features of the electronic circuitry of the telephone in accordance with the present invention and shown in FIGS. 1 and 2 will now be described with reference to the various operational conditions of the telephone.

b 1. Idle State (On-hook Condition)

During the on-hook condition, transistors Q4 and Q5 are in the off state; therefore, only a very small amount of leakage current flows between the tip and ring conductors from the central office and through the telephone (i.e. on the order of 5 microamperes or less). This leakage path is through resistor R47. The central office requires 20 milliamperes or more of loop current to qualify an off-hook condition. The leakage current path just described further includes the following: negative battery from central office to the ring conductor, through the normal current detector U10, through the bridge CR11 to resistor R47 and thence connected to the negative terminal of CR11, which in turn is coupled to the unswitched ground through resistor R47. The leakage current continues to flow up through the negative side of capacitor C4 to the positive terminal, which is the 5-volt buss and thence through the speech hybrid circuit U11 to the positive terminal of CR11, to the tip conductor, back to earth ground connection in the central office which is positive central office battery. An important aspect of the present invention is the utilization of a relatively large capacitor for element C4; typically, capacitor C4 has a very high capacitance, on the order of 0.22 farad and is therefore referred to as the "super capacitor" of the circuit.

As a result of the leakage current conduction described above, capacitor C4 is maintained in a charged state, providing operating voltage to integrated circuits U12 and U103. Both of these integrated circuits are CMOS devices, and therefore require operating currents well below 5 microamperes.

During the on-hook condition, transistors Q2 and Q12 are off and therefore a logic "zero" is present on the emitter of Q12 and the gate of integrated circuit U12 as a result of which the field effect transistor Q11 is in the off state. Therefore, the switch ground is open. Since the switch ground is open to the microprocessor U4 and the EPROM U3 and E2ROM U13 and U14, then a majority of the circuits in the telephone are in a powered down condition. Transistor Q7 is also in the off condition and therefore Q6 is off which disconnects the 6-volt battery B1 from all of the logic circuits.

2. Off-Hook Condition

When the telephone comes off hook, the hook switch S1 closes and places the negative voltage at negative terminal of bridge CR11 to resistor R37, causing diode CR3 to be forward-biased. This results in current flowing between the base and emitter of transistor Q4 and through diode CR7, and thus through speech hybrid circuit U11 to the positive terminal of the bridge CR11. Resistor R37 has an impedance on the order of 10,000 ohms, and therefore only a small amount of current is being drawn from the central office loop current, and is not sufficient to cause an off-hook state to be sensed at the central office. However, transistor Q4 is now forward-biased, causing the collector of transistor Q4 to pull positive and in turn forward-bias transistor Q5. Transistor Q5 now becomes heavily conducting, which bypasses the current around the hook switch S1. Since transistor Q5 is conducting, the collector of that transistor is low, which is a parallel current path around the hook switch S1 and therefore maintains transistor Q4 in an ON condition. The configuration of transistor Q4 and Q5 are such that they latch each other ON once they are in conduction, so long as there is DC current through the circuit. Thus, the combination of transistors Q4 and Q5 function in a manner similar to a semiconductor controlled rectifier (SCR) except that transistor Q3 serves as a means to turn transistors Q4 and Q5 off, thus interrupting the loop current between the tip and ring conductors, except as is discussed below. Normally, loop current will continue to flow with transistors Q4 and Q5 ON, even if the hook switch S1 is open, i.e. in the on-hook condition.

Resistors R37, R36, R26 and R35 form a voltage divider network that monitors the charge across super capacitor C4. This is a safety feature that keeps the microprocessor U4 and other logic circuits from operating until there is a sufficient operating voltage provided for by the loop current. Resistor R26 is a positive temperature resistor that temperature compensates in the voltage divider circuit, in order to allow correct turn-on of the logic circuits under a wide temperature range. The operation of this turn-on circuit is as follows: after the hook switch S1 is closed and loop current flows between the tip and ring conductors and through transistors Q4 and Q5, the junction of the cathode of diode CR3 and resistor R37 are held negative, and super capacitor C4 then charges to within one diode drop (0.7 volts due to diode CR10) of the Zener voltage of diode CR7. When super capacitor C4 develops sufficient operating voltage (on the order of 4.5 to 5.5 volts), the emitter-base junction of transistor Q2 becomes forward-biased. After this occurs, the collector of transistor Q2 pulls to about 5 volts, causing transistor Q12 to conduct; because this transistor is configured as an emitter follower, the emitter of that transistor approaches the 5-volt potential, causing capacitor C21 to charge through resistor R86. Once capacitor C21 charges to a 5-volt level, a logic "one" condition is presented to the gate of integrated circuit U12. The output of that gate terminal of circuit U12 drives the gate of field effect transistor Q11, causing Q11 to turn on. When in conduction, field effect transistor Q11 turns on the switched logic ground connected to the drain of that device. All logic circuits are now in a powered up state and ready to perform their tasks. The first duty of the microprocessor U4 following the off-hook condition and the powering up from loop current as discussed above, is to place relays K102 and K101 in the reset, or deenergized condition. The drawing of FIG. 1 shows these relays in that deenergized state.

All of the loop current from the central office passing through the tip and ring conductors passes through the 5-volt power supply of the telephone, and will also pass through the hybrid circuit U11, since that circuit is in series with the current path. Hybrid circuit U11 is a conventional device, such as a Texas Instrument TMS 1705 or Samsung KA2412, and converts the telephone tip and ring conductors from an audio two-wire circuit to a four-wire circuit, wherein transmitter power of the handset associated with the telephone is separated from the receiver power. To this end, transistor Q14 serves as an electronic switch that is capable of turning the handset transmitter either OFF or ON under control from the microprocessor U4. Transistor Q8 is also an electronic switch which is capable of turning the receiver either OFF or ON under control of the microprocessor U4. Any audio modulation associated with the loop current from the central office is detected by hybrid circuit U11, is amplified and is then sent to the receiver of the handset via transistor Q8. When the transmitter picks up audio from the handset transmitter and transistor Q14 is ON, hybrid circuit U11 amplifies that signal and modulates the loop current with the received audio signal from the handset. Hybrid circuit U11 is a bridge circuit that prevents the audio from being fed back to the receiver of the handset.

The microprocessor U4, which suitably is a 655 C 150 manufactured by GTE Microcircuits, is also capable of generating audio frequencies between 10 Hertz and 3000 Hertz. All modem tones, all DTMF digits, all coin tones, busy signals and the like associated with the conventional operation of a telephone receiver and transmitter are generated at the analog output of the microprocessor U4 in accordance with standard operating conditions, and inserted into the transmitter input of the hybrid circuit U11. Hybrid circuit U11 then amplifies the audio signals from the microprocessor U4 and presents those signals to the telephone tip and ring conductors for transmission to the central office.

The DC current through the hybrid circuit U11 results in a small DC voltage dropped across that circuit, causing the emitter-base junction of transistor Q7 to be forward-biased. When transistor Q7 is in saturation, the collector is pulled positive, causing diode CR5 to be forward-biased. Diode CR5 in turn initiates conduction in transistor Q6, which in turn applies the battery B1 across the logic supply of the telephone. Unless the 130-volt inverter (note the extreme left-hand portion of FIG. 1A) is ON, the battery will not be required to supply any power to the circuit. In fact, the excess current through the loop will be diverted into the battery, resulting in a positive charge being applied to the electronics as long as the phone is off-hook. Thus, it will be seen that the power for of the electronic circuitry is entirely derived from the direct current component of the loop current along the tip and ring conductors.

3. Audio Receiver

The telephone shown in the drawing has the ability to recognize and identify conventional audio signals being presented to the telephone from the central office along the tip and ring conductors, and to respond accordingly. Typically, the tones required to be identified are: 380 Hertz for call processor answer; 400 and 440 Hertz for OCC answer tone; bell bong tone of 941/1477 Hertz, followed by decaying dial tone; and 300 Baud FSK signals. The audio take-off point is the positive terminal of bridge CR11 and is presented to integrated circuit U15A which is a two-pole high-pass filter. The purpose of the filter U15A is to remove all traces of 60 Hertz power line distortion so as to avoid jamming the receiver. The output of the high-pass filter U15A goes through buffer U15B and to the notch filter U15D. Unless the bong tone is being detected, the notch filter U15D is turned off by the microprocessor U4. In that OFF state, the notch of the filter U15D becomes an "all pass" filter. Thus, the output of filter U15D is presented to the squaring circuit of U15C. Resistor R114 and capacitor C28 develop the power for the operational amplifier U15. The microprocessor U4 analyzes zero crossings of the audio signal to determine the frequency of the incoming signal and its pulse duration. When the bong tone is being received, the microprocess U4 inserts the notch filter U15D in the circuit to trap out the 1477 Hertz element of the 941/1477 Hertz combination. The microprocessor then looks for the 941 Herts element of the tone pair.

4. Open Loop Coin Check

The telephone has associated conventional coin switches which are used to monitor the coins that are deposited. When the telephone is installed, the base rate required for a local call is programmed into the memory of the EPROM U3; this is a memory device that is non-volatile and is field-programmable. When a local call is dialed from the telephone, the central office will look at the telephone to determine if the local base rate has been deposited. A preferred method for accomplishing this is through the use of an open loop coin check. This occurs when the central office removes the battery voltage from the telephone line for several milliseconds, and then applies a high impedance, high voltage battery to the tip conductor with the ring conductor open. Again, this is a conventional technique used in present-day coin telephone systems.

The telephone shown in the drawing detects this loss of loop current by monitoring normal and reverse current detectors U9 and U10. When the loop current is interrupted, the telephone responds by comparing the amount of coinage deposited with the base rate programmed in the memory of the EPROM U3. If the base rate has been satisfied, the telephone energizes relay K102 by activating its set contacts. Any coin deposited in the telephone will cause the associated coin present switch to close and stay closed as long as the coin is held in escrow. Only the application of a negative or positive 130-volt refund or collect pulse will remove the coin from escrow. Once the loop current from the central office stops, transistor Q7 turns off, removing the forward bias from diode CR5. However, capacitor C7 is charged at this time and maintains field effect transistor Q6 in the ON state until capacitor C7 discharges through resistor R42. This discharge time is on the order of 7 to 8 seconds. Consequently, the battery B1 remains connected to the logic power supply for this time interval. The forward bias on transistors Q2 and Q12 is also lost when loop current is interrupted. However, the charge on capacitor C21 maintains a logic "one" state on gate U12 for 4 to 5 seconds after transistor Q12 turns off. The discharge timing associated with this portion of the telephone circuitry is determined by resistor R87. As long as capacitor C21 is charged, the logic switched ground is applied to the microprocessor U4, which will continue to operate. Several milliseconds after the removal of loop current, the central office will place a negative 48-volt potential on the tip conductor through a high impedance ground detector, which is typically on the order of 8000 ohms. If the base rate is accurate, current flows from the negative 48-volt battery terminal in the central office, through the central office ground detector circuit and to the tip conductor of the telephone line. From the tip conductor of the telephone, the current flows through the energized contact of relay K102 to the deenergized contact of relay K101. The signal is then presented to the coin present switch, then to the coil of the escrow relay ERC back to the telephone and through the couplers U100 and U101, and thence to the earth ground of the telephone. Since the positive terminal of the central office 48-volt battery connects to earth ground, then there is current flow through the coin detector circuit to the central office on the order of 7 milliamperes or less. This satisfies the coin test and the central office will then let the call proceed. Since about 40 milliamperes or greater of current flow through the escrow relay ERC is required to refund or collect a deposit, the monies held in escrow will remain in escrow. Further, since about 30 milliamperes of current are required to activate the couplers U100 and U101, no output will be given from these circuits at this time. The central office then removes the 48-volt current and reconnects normal central office battery. The microprocessor U4 detects this reapplication of the "talk" battery via circuits U9 and U10. The microprocessor U4 then resets the relay K101. This removes the earth ground connection to the tip conductor via the escrow relay ERC.

If the base rate has not been satisfied, then the telephone will not operate relay K101 and therefore there is no current flow into the tip conductor to activate the coin detector. The central office will therefore block a call that has not satisfied the base rate requirement.

5. Coin-Free Calls (Fake Coin Ground)

If appropriately programmed into the telephone, a local call may be allowed to be completed without the deposit of any coins. Assuming that the telephone is so programmed, both relays K101 and K102 will be energized when the coin check is made. As a result, the coin detect current will pass through the tip conductor of the telephone and through the energized contact of relay K102 as described above. However, the sensed current will be applied to the bridge CR111 via the energized contact of relay K101. This sensed current will pass through the bridge CR111, through transistor Q109, resistor R132 and back to the bridge circuit CR111 to earth ground. This current flow criteria satisfies the coin check and the central office processes the call as if a coin had been deposited. The bridge CR111, transistor Q109, resistor R133, capacitor C106 and resistor R132 act as an inductor simulator having a relatively low DC resistance on the order of 1,000 ohms and a relatively high AC impedance on the order of 100,000 ohms, and uniquely allows the simulated coin ground to be applied during the talk state continuously, especially for continuous ground type installations for coin ground.

6. Refunds or Collections from Central Office

Typically, the central office initiates a refund or collect signal by disconnecting the central office "talk" battery, which in turn interrupts loop current along the tip and ring conductors. The telephone detects this state by monitoring output from circuits U9 and U10. If a coin is in the telephone, the relay K102 is energized. Several milliseconds later, the central office will apply either a negative 130-volt (refund) signal or a positive 130-volt (collect) pulse to the tip conductor with the ring conductor either open or short-circuited to the tip conductor. This high voltage pulse will enter the tip conductor of the telephone and pass through the energized contact of relay K102, through deenergized contact of relay K101, through the closed contact of the coin present switch, through the escrow relay coil ERC and through opto-couplers U100 and U101 to earth ground. Since the positive and negative 130-volt supplies in the central office are referenced to earth ground, a heavy current greater than 45 milliamperes will flow through the escrow relay ERC when these voltages are applied during the refund or collect cycle. This current will cause the escrow relay to either refund or collect the monies held in escrow, dependent on the direction of current flow. A positive current through the ERC relay causes monies to be collected, and if the negative 130-volt supply is applied, the current will flow in an opposite direction through the ERC relay resulting in a refunding of monies held in escrow. Currents that are greater than 30 milliamperes through the ERC relay will operated either coupler U100 or U101. A refund pulse will activate U100, causing the collector of U100 to pull to a logic "one" (5 volts). This signals the microprocessor U4 that the money has been refunded. A collect pulse activates coupler U101, causing the collector of U101 to pull to logic "zero," which is inverted to a logic "one" by circuit U103C, which turns on transistor Q102 and sets latch U103A/B. The microprocessor U4 monitors the collector of transistor Q102 to determine if the collect pulse is present. Latch U103A/B is for the purpose of monitoring collect pulses if the phone is on-hook, the microprocessor is shut down and the collect pulse is applied. This will be described below in greater detail with reference to the "hang up" circuit description.

As soon as a coin clears the hopper in the telephone, the coin present switch opens in a conventional manner. The central office monitors the current flow to the telephone during the collect or refund cycle, and a pulse is applied for approximately 750 milliseconds. If, at the end of this period, current is still present to the escrow relay ERC, the central office interrupts and treats this as a "stuck" coin condition. Several more collect or refund pulses will be applied, and if the coin present switch does not open, the central office sounds an alarm indicating the telephone is out of service due to a stuck coin. After removing the collect or refund pulse, the central office reapplies the "talk" battery. The telephone then detects this condition by monitoring circuits U9 and U10 for the reapplication of loop current. When this happens, the telephone resets relay K102. Note that at any time relay K102 is energized, the 130-volt inverter is disconnected from the circuits of the telephone. This prevents the central office minus or positive 130-volt signal from dumping into the inverter circuit.

7. Refunds or Collections from Telephone

The microprocessor U4 also has the ability to control the collection or refunding of a deposited coin. Under these circumstances, the microprocessor U4 generates a high frequency square wave and presents it to the 130-volt inverter. The output of the inverter passes through the deenergized contact of relay K102, the other set of contacts for relay K102 being open, therefore keeping the inverter voltage from feeding onto the tip and ring conductors. Inverter current, after passing through relay K102, passes through the coin present switch to the coil of the escrow relay ERC to detectors U100 and U101 and thence to earth ground. This activates the escrow relay ERC and coins are either refunded or collected, depending upon the polarity of the inverter signal. The microprocessor U4 monitors couplers U100 and U101 to determine if the coins become stuck, or when they are cleared. To conserve energy, the microprocessor U4 applies a short pulse to the relay and if the coin activity stops, the pulse is not repeated.

8. Hang Up Circuit Condition

The microprocessor U4 determines if the telephone is in on-hook or off-hook conditions by monitoring the voltage at the junction of resistors R37 and R36. The on-hook condition causes this junction to go to the logic "one" or 5-volt potential. Under these conditions, loop current continues to flow heavily into the circuit, since transistors Q4 and Q5 are still conducting. Upon hang up of the hook switch, transistors Q2 and Q12 are turned off, and therefore capacitor C21 begins to discharge through resistor R87. The circuit elements are selected such that the discharge time is approximately 5 seconds. The microprocessor U4 does all processing chores necessary to terminate the call before opening the circuit connection between the tip and ring conductors, to effectuate an "on-hook" condition to appear to the central office. This permits a significant amount of loop current to be available to accomplish all tasks that require large amounts of power before the disconnect is complete. These tasks performed by the microprocessor U4 after hanging up and resuming the on-hook condition, but before terminating loop current, constitute various call accounting functions (such as coin status, for example) which may be stored into the E2ROM to be preserved for future reference. The microprocessor U4 also resets the latch circuit U103A/B at this time and energizes relay K102. The microprocessor then places a logic "zero" on the base of transistor Q3, causing that transistor to conduct. With transistor Q3 in conduction, the emitter-base junction of transistor Q4 becomes starved for current and therefore that transistor shuts off causing transistor Q5 to be shut off. This opens the central office loop current path between the tip and ring conductors. The central office will consider the call to be abandoned after 1.5 seconds without the flow of loop current. The microprocessor will maintain Q3 in the ON state for the full 1.5 second period, even if hook switch S1 is reclosed during this interval. This keeps the user of the instrument from interferring with the disconnect cycle, and also prevents the use of a technique known as hook switch fraud.

After the central office recognizes the on-hook condition, the ring conductor is open and the central office then places a negative or positive 130-volt pulse onto the tip conductor to clear any coins that may be in the telephone, as was described above. After an interval of 5 seconds, the line opens and loop current to the telephone is interrupted and transistor Q11 turns off the microprocessor power, as well as most logic power. The battery B1 is also disconnected 8 to 10 seconds after loop current interruption and capacitor C7 discharges and turns the field effect transistor Q6 off. Diode CR22 is a safety device to ensure that the telephone is on-hook and that the microprocessor U4 operated properly and opened the telephone line. When switched logic power is turned off, a negative pulse is differentiated through capacitor C40 to diode CR22, which forward-biases transistor Q3, which turns off transistors Q4 and Q5 in the event that they are still in conduction at this time. Note that the logic may be run from a combination of the power from super capacitor C4 and the battery B1 in the absence of any loop current; however, the telephone is capable of operating its logic solely from the charge in capacitor C4 for the 5-second interval after hang-up. The battery B1 is only necessary to provide the high energy positive or negative 130-volt pulse to the escrow relay ERC, as discussed above.

9. Telephone Self-Originate and Answer Functions

The telephone has the ability to originate an outgoing call, which may for example be to a computer via a modem terminal. The telephone has the ability to also receive and transmit 300 Baud FSK signals to communicate with computers with modems for the purpose of reporting phone status, change programming options, call accounting, coin accounting and the like.

To answer an incoming call, the ring signal from the central office is detected by circuit U8. This device sets the latch U104B/C. When the ring signal stops, latch U104A output goes high, which undergoes a level shift and the hook shift S1 is bridged via transistor Q106. The remaining off-hook process is the same as described above. Resistors R122 and R119, diode CR115 and capacitor C110 serve the function of screening types of incoming signals so that normal incoming signals will not activate the telephone to the self-answer condition.

If the telephone is to originate a call, the microprocessor U4 sets the latch U104B/C on the previous call so that when it completes a call and the line is disconnected, transistor Q106 turns on and once again bridges the hook switch S1.

It will be appreciated that the telephone of the present invention provides a means for powering the telephone entirely from the DC component of loop current along the tip and ring conductors during the off-hook condition, and further includes a charge storage element and means for delaying the powering of the telephone until the energy within the charged storage element (super capacitor C4) reaches a predetermined level to ensure that adequate voltage is available for the logic circuitry.

The telephone described above provides a system in which loop current flowing from the central office and through the tip and ring conductors may be maintained after resuming the on-hook condition for a predetermined period of time to accomplish certain telephone functions, such as call accounting or to frustrate attempts at hook switch fraud. This telephone also provides a means for utilizing loop current to power the telephone to initiate outgoing calls after resuming the on-hook condition in order to report various call accounting functions such as the amount of money in the coin box, a coin box full condition, to report a phone abnormality or to report a fraud or theft attempt. Further, the use of a simulated inductor in this system facilitates the placing of coin-free calls as programmed into the telephone, while avoiding the difficulties associated with the use of a resistive only element in the circuit.

This telephone system further provides means including a single coin ground relay (K102) for providing an open-loop coin check, and means at the local telephone for sensing coin conditions and operating the escrow relay without control from the central office. Further, after loop current has been interrupted and the telephone electronics have been deenergized, coin totalization can be accomplished following receipt of a collect pulse from the central office by the resetting of latch U103A/B before shut-down.

What is claimed is:

1. A pay telephone for use in a telephone system with a central office having a coin trunk including tip and ring conductors coupled to said telephone and in which loop current flows from said central office and through said telephone responsive to an off-hook condition at said telephone being sensed by said central office, said pay telephone comprising:
   a hook switch for closing a circuit path in said telephone between said tip and ring conductors so that said loop current flows through said telephone; and
   means for establishing said loop current flow through said pay telephone for a predetermined period of time after said hook switch is opened.

2. The pay telephone system recited in claim 1 wherein said telephone comprises escrow relay means and said loop current establishing means comprises means for continuing loop current flow for a period of time sufficient to operate said escrow relay means.

3. The pay telephone system recited in claim 1 wherein said establishing means comprises means for continuing loop current flow through said telephone for a period of time to prevent any attempt at hook switch fraud through rapid keying of said hook switch.

4. The pay telephone system recited in claim 1 further comprising means for continuing loop current flow through said telephone for a period of time sufficient for preventing said central office from disconnecting said tip and ring conductors until an incoming or outgoing call is legitimately terminated.

5. The pay telephone system recited in claim 1 wherein said telephone comprises means for providing a call accounting function for each completed call, said establishing means comprising means for continuing said loop current flow through said telephone for a period of time sufficient to complete said call accounting function.

* * * * *